United States Patent [19]

Smith

[11] 4,285,041

[45] Aug. 18, 1981

[54] DIGITAL PACING TIMER

[76] Inventor: Kent G. Smith, 51 W. 83rd St., New York, N.Y. 10024

[21] Appl. No.: 51,016

[22] Filed: Jun. 22, 1979

[51] Int. Cl.[3] .......................... G06F 15/42; A63B 5/00

[52] U.S. Cl. .................................. 364/415; 235/92 T; 235/105; 272/100; 340/384 E; 364/569

[58] Field of Search ............... 364/413, 415, 561, 569; 235/92 DN, 92 FQ, 92 T, 92 CA, 105; 272/100; 340/573, 321, 384 R, 384 E; 73/489, 490

[56] References Cited

U.S. PATENT DOCUMENTS

| | | | |
|---|---|---|---|
| 3,492,582 | 1/1970 | Heywood | 272/100 |
| 3,797,010 | 3/1974 | Adler et al. | 235/92 FQ |
| 3,846,704 | 11/1974 | Bessette | 235/92 FQ |
| 3,995,492 | 12/1976 | Clynes | 340/384 E |
| 4,028,693 | 6/1977 | Kuntz | 272/100 |
| 4,053,755 | 10/1977 | Sherrill | 364/561 |
| 4,220,996 | 9/1980 | Searcy | 364/561 |

OTHER PUBLICATIONS

"Timing Improves with Pacer Device", The Sporting Goods Dealer, Sep. 1963, p. 193.

*Primary Examiner*—Errol A. Krass

*Attorney, Agent, or Firm*—Kenyon & Kenyon

[57] ABSTRACT

A pacing timer for a runner which includes an internal memory for storing split distances and target times as well as a variety of stride lengths which correspond to various speeds of the runner. The logic circuitry of the timer determines the runner's stride time in accordance with this data and sounds a repeating stride tone. A number of features are shown, including means for altering the stride time by activation of controls during the run, displaying distance traversed, a catch-up means for redefining the stride time so that the runner can recover lost time, means for displaying the runner's status at any given instant in regard to his target time, means for computing deficit times into target times for future splits so that the runner can get back on schedule or change schedule, and means for recording the runner's performance in the device's internal memory for output to a magnetic record member for storage and future use. Other features are disclosed such as pulse-rate monitoring in regard to a maximum pulse rate value entered into the device's memory.

32 Claims, 8 Drawing Figures

FIG. 2

ET, TD, STA DISPLAY

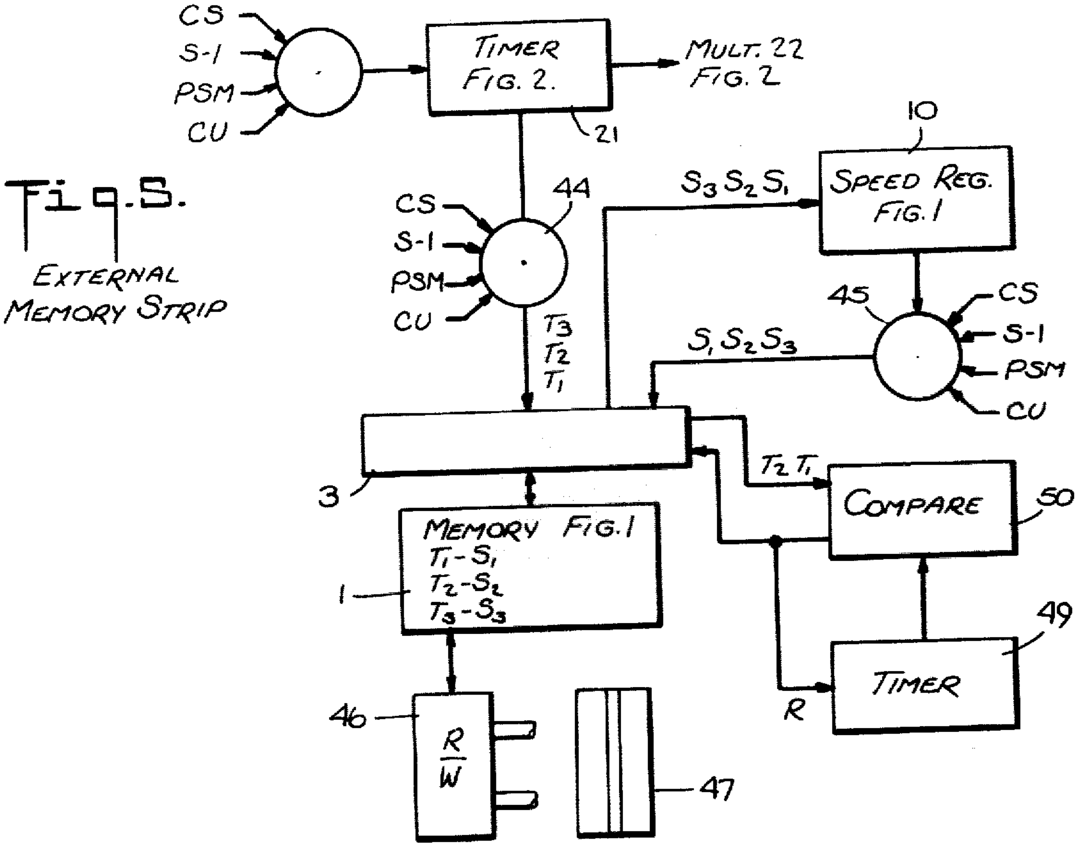
Fig. 5. EXTERNAL MEMORY STRIP
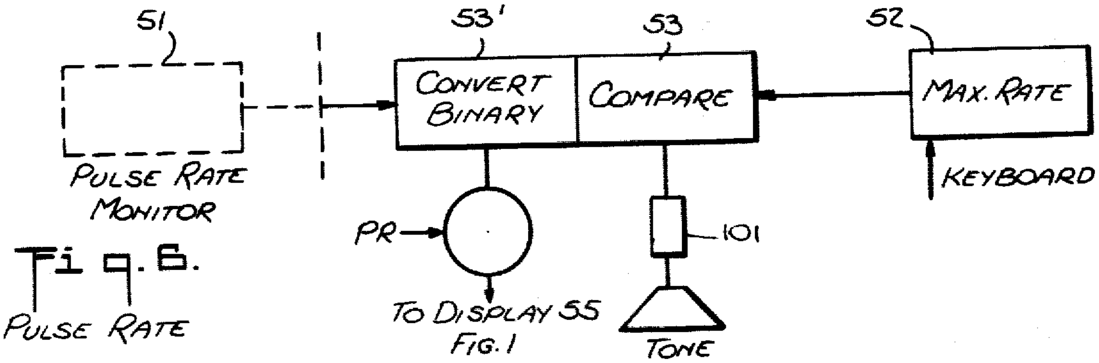
Fig. 6. PULSE RATE
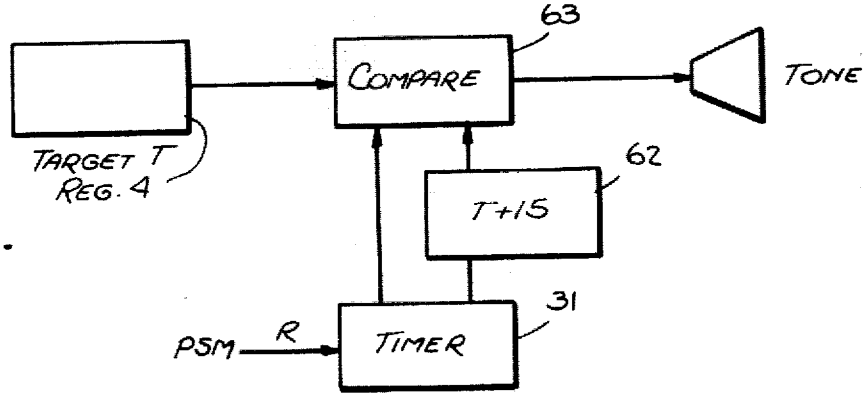
Fig. 7.

DIGITAL PACING TIMER

BACKGROUND OF THE INVENTION

1. Field of the Invention

The invention relates to pacing timers which are used by runners to provide information to the runner during the course of a race such as striding signal tones and visually displayed data.

2. Description of the Prior Art

The prior art shows a number of devices which provide repeating tones. See, for example, U.S. Pat. Nos. 3,789,402, 3,893,099, 3,882,480 and 3,540,344. These are metronome-like devices which simply generate a repeating tone signal at constant intervals. Before running, the runner can set the length of the interval, just as a musician would set the frequency of a metronome. In these prior art devices there is no recognition of the fact that a runner's stride length varies with the speed at which the runner is running and that the runner, in the course of a race, will change his speed and consequently stride length periodically. These prior art devices are directed to teaching a runner to develop a constant stride which is defined by an audible signaling tone and do not contemplate strides of various lengths during the course of a single run. If the runner should choose to change his speed during the course of a run, he must change the frequency of the tone signal by stopping to reset the device and the fact that the runner's stride length would change with this speed change would be ignored by these prior art devices. Thus, such repetitive tone devices have no capability of measuring a runner's distance accurately. Moreover, these devices are not responsive to the varied informational needs of a serious runner who may change speeds and strategies during the course of a race and will need records made of these changes so that overall goals will not be abandoned.

The devices taught in U.S. Pat. Nos. 3,901,121, 3,038,120 and 2,926,347 provide metronomes for musical training and are not related to the needs of a runner.

The devices taught in U.S. Pat. Nos. 3,119,610, 4,028,693, 2,457,968 and 3,846,704 are mounted adjacent to a track or swimming pool and do not respond to a runner's changing needs during the course of a race.

A further difficulty encountered by runners is that they lack critical information concerning their performance during a race. In distance races (over 5,000 meters), race officials may locate markers or individuals (with stop watches who also call out the total elapsed time if they were close enough to hear the starting gun) at specified intervals on the course, but this provides the runner with only the most minimal information and then, only at the split markers. But even with this information, it is quite difficult during the race for the runner to translate his elapsed time and distance information into other more usable information such as:

(1) how fast am I running now, as opposed to my overall average speed for the race?

(2) given the time remaining, how much must I increase my speed if I want to finish the race in a specific time?

(3) if I want to run the last eight miles at a rate of a mile in 6 minutes and 40 seconds, how fast do I stride, i.e. pick up one foot and put down the other?

(4) if I cannot run at such a rate, what will my final time be?

(5) if I get a "second wind", what will my final time be if I can keep up my new and slightly (but how much?) faster rate?

(6) how far have I run?

(7) what is the most consistent rate at which I may run for the entire race?

The principal problem with the current state of the art is that existing devices force the runner to adapt his style of running (the length of his stride or its frequency) to the particular device rather than having the device adjust itself to the runner. Thus, although some of the devices give an audible metronome-like tone signal to the runner indicating the frequency with which strides of predetermined length must occur if the runner wants to cover a predetermined distance in a predetermined length of time, these devices cannot adjust themselves to variations in the way a runner runs.

Because of fatigue, differences in terrain or temperature, stimulation from adjacent runners, blisters, pulled muscles, cramps or other aliments, need for water, or a myriad of other factors, no course of any significant distance can be run from start to finish using a uniform stride length or frequency. At the start of a race, a runner is never really sure how he will feel during the race. Although serious runners know that their best overall time will result from running splits which are as nearly equal in time duration as possible, they accomplish this by variations in stride length and rate of striding and not by running identical strides from beginning to end. Only if the course were absolutely flat, all in the sun or all in the shade, and no other variables affected the runner—an impossible situation—could a perfectly consistent race be run.

Another problem with existing devices is that they are based upon an incorrect belief about how people run. For example, Heywood (U.S. Pat. No. 3,789,402) says:

". . . as a runner becomes fatigued, there is a tendency to modify his pace or stride length. For example, the fatigued runner tends to maintain a consistent stride length but take fewer steps. Alternatively, a runner may take the same number of steps over the running course but shorten the stride length." (emphasis added)

The results of my research contradict these statements. The Heywood Patent assumes that a runner has a single preferred stride length. My experiments have shown that a runner has an infinite number of preferred stride lengths, each one associated with a different speed. My experiments have also shown that stride length and frequency are directly related to each other; the faster a runner runs, the longer he strides and the more rapidly he strides. Conversely, the slower a runner runs, the shorter he strides and the more slowly he strides. Thus, the solution is not, as posited by Heywood, to train a runner to maintain a single frequency of striding by feeding him a metronome-like tone signal, because the runner will not comfortably be able to maintain the single frequency and still vary his stride length so as to change his speed. My solution is to adjust the tone signal to his preferred rate of running and at the same time have the device take into account the fact that as he speeds up or slows down, the length of his stride also changes. Then the device can show him on its screen how fast he is running, i.e. how fast he is covering ground. Two runners running side by side, i.e., covering ground at the same rate, are likely to be striding at different rates, one taking slower but longer strides, and the other shorter but faster strides and their stride rates and lengths may vary constantly in a race though they are running "shoulder to shoulder."

The existing state of the art does not take these running factors into account, nor can existing devices be adjusted to any of the variables.

SUMMARY OF THE INVENTION

This invention concerns method and apparatus for providing a runner with information, both audible and visual, concerning his progress over a race or training distance with this information being dependent on preprogrammed data entered into a memory prior to the commencement of the run and also dependent upon control information entered by a runner during the course of the run. This invention further concerns the nature of the information needed by a runner in view of developing race strategies and takes into account predefined data such as target time goals for a particular run and the variations of a runner's stride length with speed. Although specific logic components are disclosed for performing the steps of this invention, such components could be either discrete or integrated. It is also contemplated that a miniature microprocessor using large scale integration circuitry and memory means (semiconductor, bubble domain, etc.), including read-out memories and random access memories, could be properly programmed to carry out the steps of this invention.

Serious runners of distance races (those of at least 3,000 meters) do not run a single race but rather run a plurality of sub-races called "splits". A typical marathon (26 miles, 385 yards) could, for example, be divided by the runner into a series of five-mile splits with the runner having a particular strategy for each of these five-mile splits and the final mile and a quarter split. The strategy could be the same for each split or could vary in that the runner may wish to complete one split in a shorter time than another because of diverse factors such as the status of the terrain (uphill versus downhill), prevailing winds, his personal preference as to his desired exertion pattern, or other factors. A strategy for a particular split would include an elapsed time goal or target time which, given the length of the split, would determine the runner's speed.

According to this invention, the runner would enter data into a memory device including the runner's target time for one or more splits, the split distance or distances, and data regarding the variation of the runner's stride length with speed. The pacing timer in accordance with the teachings of this invention will provide a repeating tone corresponding to the speed at which the runner must progress if he wishes to achieve his target time. This repeating tone signal, which is representative of stride frequency, is dependent not only upon the target time and split distance but also upon the runner's stride length at varying speeds. The stride frequency repeating tone signal will set the pace for the runner with one tone being sounded for every other stride. By taking into account the runner's variation in stride length at various running speeds, the device provides a meaningful stride frequency tone signal in correspondence with the runner's goals in all instances and for variations of the runner's speed.

At the start of the race, the runner pushes the start button and the pacing timer immediately begins to emit a repeating tone—like a metronome—which sets the pace that the runner has established for his first split, one tone for every other stride. There are several reasons that the tone sounds with every other stride:

1. as a person runs, his left arm swings forward when he strides forward with his right leg, and vice-versa with his right arm and left leg. Therefore the typical right handed person (who wears the pacing timer on his left hand) will time his strides so that he hears the tone each time his left hand is in front of him where he can hear the sound better;
2. the runner, by coordinating his arms with the pacing timer, is automatically coordinating his legs with it; the legs simply follow along, and by being forced to concentrate his thoughts on his arms rather than on his legs, leg fatigue is minimized;
3. by having the tone sound only with every other stride, the interval between tones is extended so that at faster speeds, the tone is more audible.

The tone not only assures that the runner will be running at exactly the speed he desires, but the tone also makes it easier to run; running in time to the tone is like running in matched step with other runners. For reasons that are not fully understood, running in matched step is like sympathetic vibration in physics, and the running is easier. The metronome tone signal will sound for two minutes at the start before becoming silent; thereafter, it will sound for fifteen seconds every time control SPD is pushed showing the current running rate, and every time one of the other buttons is pushed causing a change in the rate of running.

The inventive process and apparatus in accordance with this invention also allow changes in speed to be made during the course of a split. Because of fatigue, physical condition of the course, or some other factor, the runner may desire to change his speed of running at any time. According to the invention, the runner need only activate a change speed control in one of two directions in order to either increase the frequency of the repeating tone signal or decrease this signal's frequency by equal increments. Large changes in desired speeds can be effected by activating the change speed control several times in succession until a comfortable speed has been reached.

According to another feature of the invention, the "catch-up" feature, the repeating tone can be made to sound at an accelerated pace to bring the runner back on schedule should he fall behind for any reason during any particular split. As mentioned, a runner may cause the repeating tone to slow down if he finds he cannot keep up his preprogrammed pace because of fatigue or a physical impediment such as a hill. If the runner later recovers his strength or passes the crest of the hill, he may wish to increase his rate of running so as to regain his lost time and finish the split as planned. According to this invention, the circuitry within the pacing timer keeps a record of each change in speed or stride frequency which the runner has gone through during any particular split and, upon activation of the catch-up control, the pacing timer automatically calculates the stride frequency at which the runner must proceed if he wishes to complete the split on schedule.

According to another aspect of this invention, the runner may activate a control which will shorten the overall time that the runner wishes to allow himself for the entire race, with the effect of the reduction being averaged into the splits remaining to be run. It may occur that a runner finds that he has set too slow a pace, and in lieu of increasing his pace by some given fixed amount, say $\frac{1}{4}$ mph, by means of the aforementioned speed control, he can activate a control which reduces by a fixed amount the sum of the preprogrammed target times for the entire race. Larger reductions in target time can be effected by repetitively activating the target time reduction control. According to another embodiment, this reduction of time goal is effected in regard to the preprogrammed target time for a given split.

According to another aspect of the invention the pacing timer is equipped with a removable recording means, such as a magnetic strip or microcassette, which can be used as a storage for recording data related to any particular performance of the runner which had been previously entered into the pacing timer's memory. For example, a very serious runner may, in preparation for a particular race, practice running the route using various strategies until he determines that which is right for him. The runner may then run a practice race using the pacing timer to monitor his preferred combination of speeds or stride frequencies over the course with the pacing timer's memory automatically recording these speeds. This information can then be stored on the magnetic strip or microcassette and, prior to the running of the race, be reentered into the pacing timer's memory. The pacing timer then emits a tone pattern which corresponds to the pattern which the runner had selected for himself and had recorded on the recording means.

According to another aspect of the invention, the pacing timer is provided with a pulse rate monitor input and with a storage location for storing the runner's maximum allowable pulse rate. The pulse rate can be read out of the pacing timer by using the digital display and the pulse rate can be compared with the maximum allowable rate on a continuing basis with the pacing timer sounding an alarm when the pulse rate exceeds its preprogrammed maximum. By monitoring his pulse rate in such a manner it is possible for the runner to keep his running rate within safe limits and also to exert himself to the maximum safe degree.

According to another aspect of the invention the digital display can provide a visual indication to the runner of useful information including: how far the runner is ahead or behind his on-schedule time for the entire race, the speed of the runner in both miles per hour and minutes per mile, the distance so far traversed in the split or race, the elapsed time since the beginning of the split or race, and the runner's pulse rate. Upon completing a particular split, the device can automatically calculate a new speed for the next split which allows the runner to make up for any time deficit in the last split.

By the touch of a button during the race, the runner knows exactly:

1. how fast he is running;
2. how far he has run;
3. how long it has taken him;
4. how far he is ahead or behind the time for the total race on the split that he chose before the race, and
5. what he must do to adjust his speed so as to complete the race in the time he established at the outset or in less time.

BRIEF DESCRIPTION OF THE DRAWINGS

FIG. 5 shows logic for recording past performance on a memory strip.

FIG. 6 shows pulse rate warning and display circuitry.

FIG. 7 shows warning signal means indicating approaching target time.

DETAILED DESCRIPTION OF THE DRAWINGS

1. Determination of Stride Frequency

Figure 1:
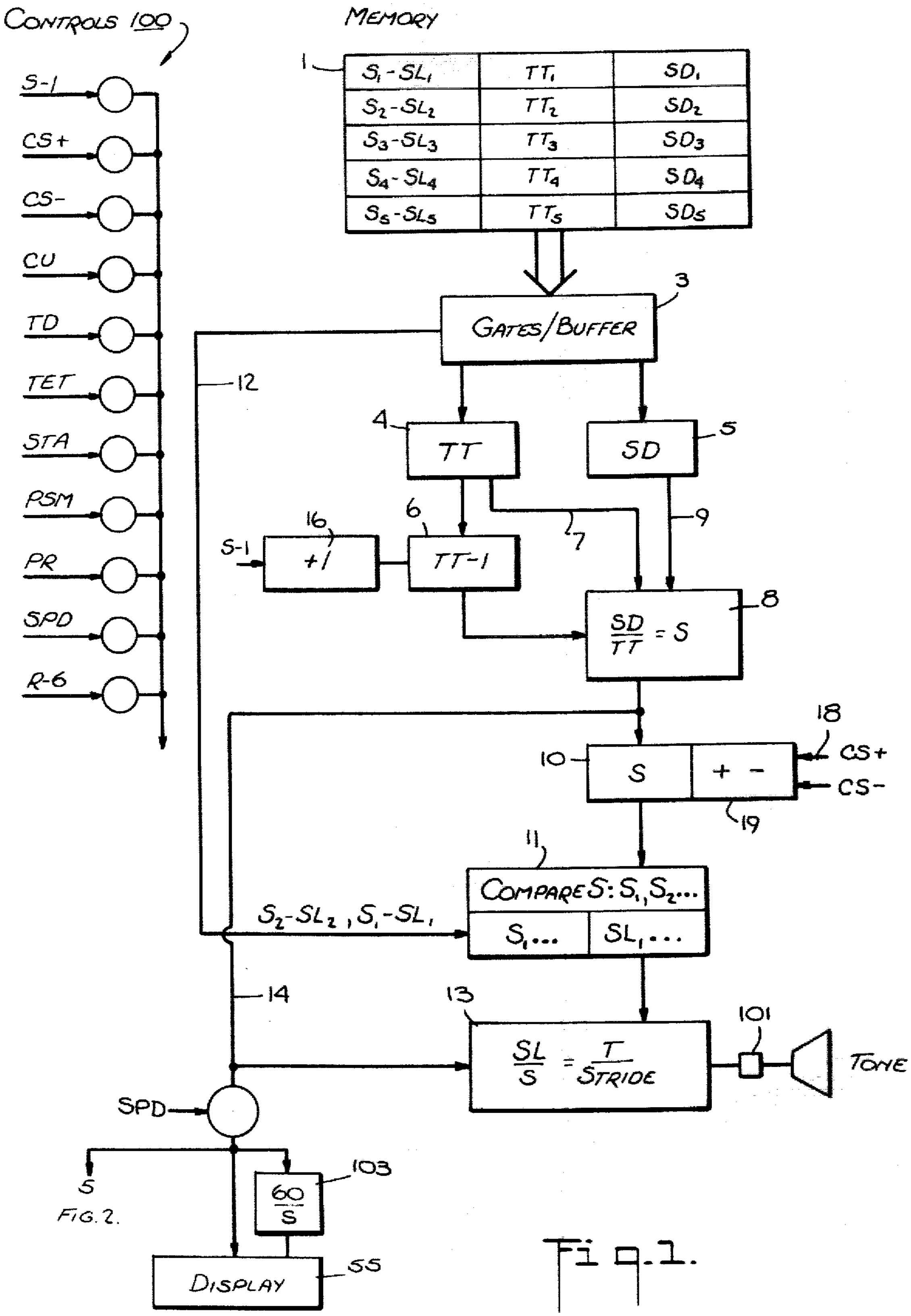
FIG. 1 shows logic for calculating stride frequency based on target times, split distances, and variable stride lengths.
Figure 8:
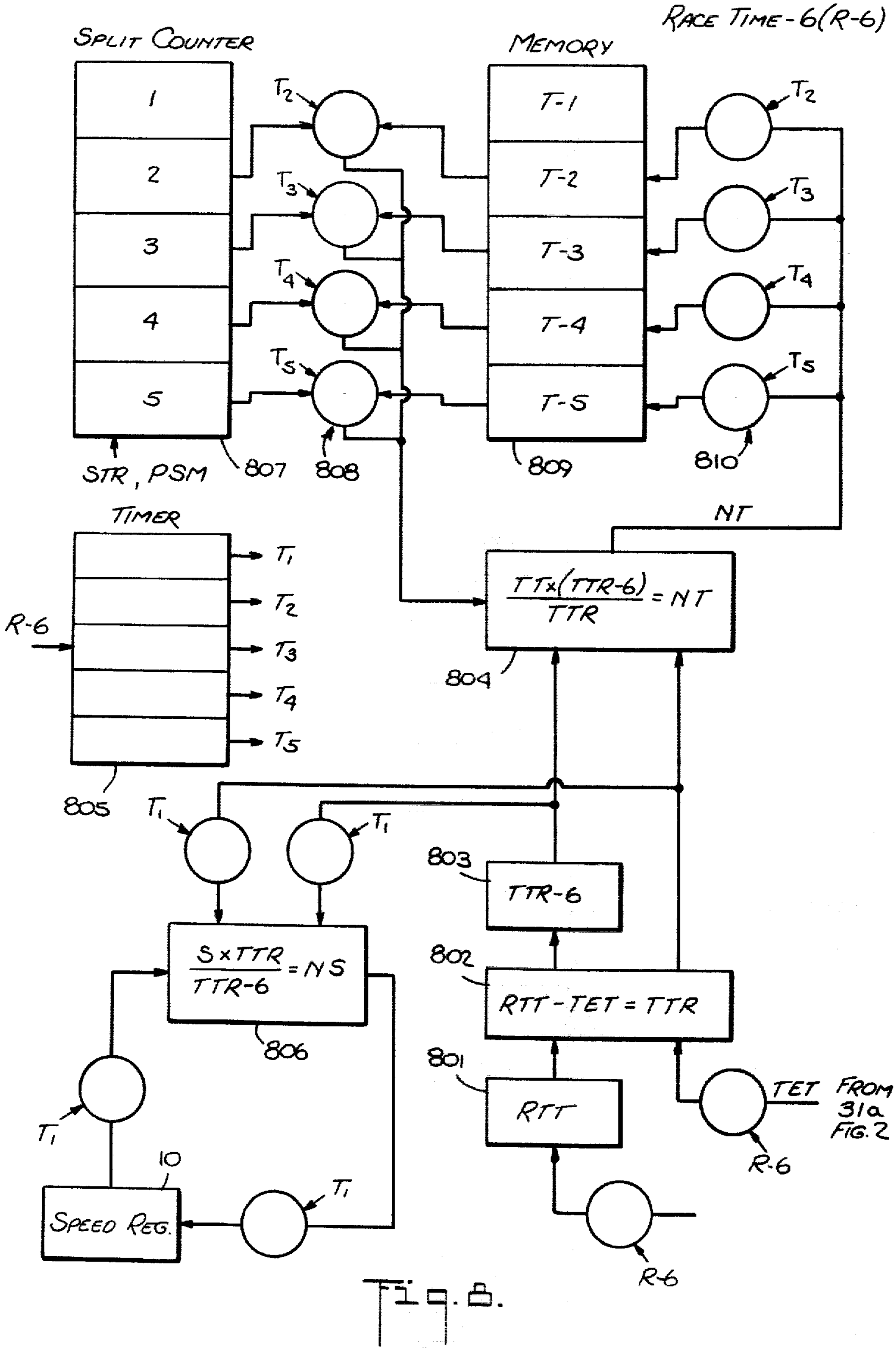
FIG. 8 shows another embodiment by which the runner can change the total time goal for the race.

Referring to FIG. 1, there is shown schematically a memory unit 1 for storing relevant information to be used in monitoring and controlling the runner's performance. The memory registers for storing various data preferably would form part of a large scale integrated semiconductor memory or a bubble domain memory. Prior to commencing the run, the runner enters into memory 1 various data by means of appropriate input means such as a keyboard (not shown). Data can also be entered into the memory registers by means of a magnetic strip read/write unit, as is explained in connection with FIG. 5. There is, of course, also provided conventional timing and memory control means which effects the entry into the memory of the various data and the reading out of these data at appropriate times in response to controls 100. Appropriate timing and specific logic for reading information into and from memories is, of course, well known in the art. FIG. 8 shows specific logic for reading information from the memory in regard to a particular specific control function not shown in FIG. 1; read-out logic similar to that shown in FIG. 8 can be used in the FIG. 1 embodiment.

Controls 100 are those controls which the runner would activate during the course of his run. Although each of the controls is explained in more detail hereinafter, there now follows a summary listing of each control together with its function: the S-1 control reduces the split target time by a fixed amount, e.g. 0.1 minutes or 6 seconds; the S-1 control is to be contrasted with the alternative R-6 control discussed in connection with the FIG. 8 embodiment wherein the total race target time (as opposed to split target time) is reduced by a fixed amount such as 0.1 minute. The S-1 control would normally be activated at the beginning of a split.

The CS control changes the speed at which the runner is to proceed by fixed increments of, for example, one quarter of a mile per hour (or one quarter of a kilometer per hour or one tenth minute per mile or per kilometer) in the positive and negative sense depending upon the direction in which the CS control is activated; the CU control initiates a catch-up function which allows the runner precisely to make up for any lost time by the end of the split.

The TD control allows display of the total distance which the runner has so far traversed since commencement of the race, but can also be adapted to display total distance within a split. The TET control allows display of the total elapsed time since the commencement of the race, but can also be adapted to display total elapsed time since commencement of the split. The STA control displays the runner's time status as of the instant of the actuation of the STA control in that there will be displayed the amount of time that the runner is ahead or behind his preprogrammed schedule for the total race.

This control can also be adapted to display the amount of time that the runner is ahead or behind his preprogrammed schedule for the split. The STA and TET controls are contemplated as being activated by a single lever having bi-directional activation capability with activation in one direction enabling STA, and other direction, TET. The PSM control is activated as the runner passes each split marker and effects the calculation of any deficit times into the target time for the next split; the PR control displays the runner's pulse rate and the SPD control displays the runner's speed.

Before the commencement of the race the runner enters into memory 1 via some suitable input such as a keyboard the split distances $SD_1$, $SD_2$, $SD_3$..., (five of which are shown in the drawing by way of illustration only) which would correspond to the portions into which the total race is divided and also enters a plurality of target times $TT_1$, $TT_2$, ... corresponding to the total target times for each split which the runner has set as his goal. Each split may be assigned a different target time, TT, in order to take into account differences in the split distance, characteristics such as predominantly uphill or downhill, upwind or downwind, rough or smooth terrain, or in order to take into account the fact that the split occurs at the beginning or the end of the race. The runner's stride lengths $SL_1$, $SL_2$ ... corresponding to his stride length at different speeds $S_1$, $S_2$ ... are also entered into memory registers. The stride length-speed correspondence can be preprogrammed into the memory based on average values. Alternatively, these data can be entered into the memory (by means of a keyboard) by each runner based on his particular stride length at various speeds. The correspondence of various speeds to various stride lengths is important since I have recognized that a runner's stride length varies with a runner's speed in a way that is unique for any particular runner. Only by taking this variation of stride length with speed into account, can an accurate control of the runner's progress be achieved. The stride lengths $SL_1$, $SL_2$... can be entered into fixed locations of the memory with each succeeding locations corresponding to a particular speed; alternatively, speed values can be entered into memory along with corresponding stride lengths. The runner can calculate his stride length at various speeds by running a fixed distance, such as one hundred yards, at various speeds while counting the number of strides and timing his run. From the time so measured the runner can calculate his speed and from the number of strides, the runner can calculate his stride length. One stride is considered to be the distance between the impacts of the back of the heel of each foot, such as from the heel imprint of the left foot to the heel imprint of the right foot.

At the start of the race, in response to the depression of an appropriate start button which is not shown in the drawings, the target time $TT_1$ is read from the memory 1 through memory gates/buffer 3 into target time register 4 and the split distance $SD_1$ is read into split distance register 5. The target time $TT_1$ corresponding to the first split is read via lead 7 into divider 8. Divider 8 also receives from split distance register 5 the split distance $SD_1$ via lead 9. Divider 8 divides the split distance $SD_1$ by the target time $TT_1$ for the split to obtain the requisite speed $S_1$ at which the runner must traverse the split. The speed $S_1$ is entered into speed register 10 and is subsequently applied to comparator 11. The comparator 11 also receives in a sequential fashion the speed-stride length correspondence ($S_1$-$SL_1$, $S_2$-$SL_2$...) from memory 1 via lead 12. These speed-stride length correspondences can be read from the memory in an automatic sequential fashion which is initiated every time a new speed $S_i$ is entered into register 10 and applied to comparator 11. The memory depicted in FIG. 1 shows only five speed-stride length correspondences for purposes of illustration only. There could, of course, be more or fewer of these correspondences in the memory, or the digital timer can be constructed and arranged to extrapolate speed-stride correspondences between the correspondences entered by the runner. Similarly the number of splits need not be limited to five.

The comparator 11 then sequentially compares the goal speed $S_i$ from speed register 10 with the speeds $S_1$, $S_2$... contained in the memory 1. When there is correspondence directly or by extrapolation between the goal speed $S_i$ and the appropriate speed $S_1$, $S_2$... from the memory 1, the appropriate stride length ($SL_i$) corresponding to the goal speed $S_i$ is thereby identified and can be outputted to divide circuit 13. The other input to divide circuit 13 is the goal speed S from the speed register 10 communicated to divider 13 by lead 14. Alternatively the speed $S_1$, $S_2$... from the comparator 11 can be applied to divider 13 as this speed should be equal to the goal speed.

If one knows the runner's required speed S (miles/hour or kms/hour) and the runner's stride length SL, the time per stride can be determined since $$\frac{\text{miles}}{\text{hour}} = \frac{\text{stride length}}{\text{time/stride}}$$

or $$\text{time/stride} = \frac{\text{stride length } (SL)}{\text{speed } (S)}$$

Thus, the time per stride (T/Stride) is determined by divide circuit 13 and sent to the sounding circuit 101. Circuit 101 causes a stride tone to be sounded after each period of time corresponding to the determined time for two strides.

2. Reduce Split Target Time (S-1) Function—FIG. 1.

It is sometimes desired in the course of running a race to change the prerecorded data contained in the memory 1 because of the fact that a runner may find that he is capable of a better performance than he originally contemplated. According to one embodiment, the runner may wish to complete a split within a new target time shorter than the preplanned targets $TT_1$, $TT_2$... contained in the memory. The runner, by actuation S-1 control button, can cause the signal S-1 to be produced which causes adder 16 to enter "1" into subtractor 6 so as to subtract six seconds from the target time TT location in register 4. Of course, the increment need not be six seconds but could be another value. The new target time will, therefore, be the preplanned target time minus six seconds with this new value being fed, after calculation by subtractor 6, to divider 8. If the runner wished to reduce his target time goal for any particular split by, for example, thirty seconds, the runner would activate the S-1 control five times in succession causing the value 1 to be read into adder 16 five times for a total of thirty. The thirty second value would be transferred to subtractor 6 which would subtract thirty seconds from the target time TT contained in target time register 4 and enter the new value into divider 8 which could calculate a new goal speed value S corresponding to the new pace which the runner has set for himself. The S-1 control should be used at the beginning of a split. If used during the split, the time already passed in the split, $SD_T$ (See FIG. 2) would first be subtracted from the target time TT located in register 4 before adder 16 enters 1 into subtracter 6. As discussed above, the new goal speed S would be passed to the comparing circuit 11 which identifies the appropriate stride length SL in memory 1 for use in determining the accelerated stride. As an alternative to the S-1 control, the R-6 control described in connection with FIG. 8 can be used to reestablish the target time for the entire race, as opposed to split, although the pacing timer can have both an S-1 and an R-6 control.

3. Change Speed (CS) Function—FIG. 1.

The runner can also change his goal speed by a fixed predetermined amount in either the positive or the negative direction by actuating a lever control causing a signal to appear on the change speed lines 18. For example, actuation of a lever control in one direction indicates a desired decrease in speed while actuations in the other direction indicate increase. The change speed signal CS causes a fixed amount, say one-quarter of a mile or of a kilometer per hour, to be entered into adder/subtracter 19 and to be added or subtracted from the goal speed in speed register 10. By repetitively actuating the change speed control, the runner can change his running speed by such incremental amounts until the right speed has been determined.

4. Speed Display SPD—FIG. 1

FIG. 1 shows display 55 which can be a digital liquid crystal display provided with appropriate conventional conversion circuitry for displaying various data to the runner in response to the operation of controls 100. Activation of control SPD causes display 55 to provide a digital visual indication of the runner's speed for a predetermined amount of time, e.g. 15 seconds, or until another control calling for a different display is activated. Divide circuit 103 may be provided so that the runner's speed in miles per hour and minutes per mile can be displayed. Of course, it is understood that any particular units, such as kilometers, could be used by the provision of appropriate conversion circuitry.

5. Total Race Distance Display TD (FIG. 2)

Figure 2:
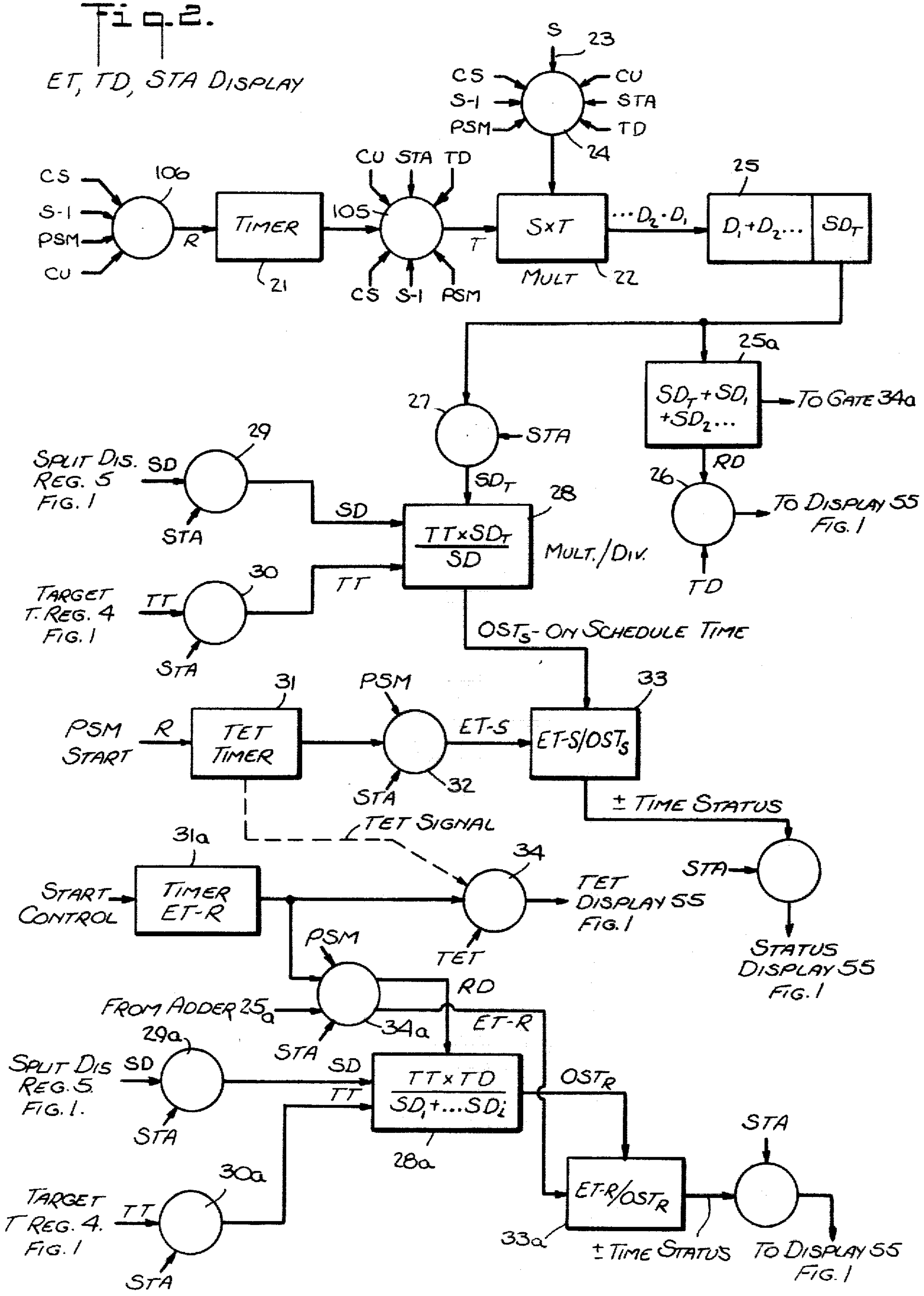
FIG. 2 shows logic for displaying elapsed time (ET), total distance (TD), and status (STA).

The logic shown in FIG. 2 includes a timer 21 which is initiated each time the CS (change speed), S-1 (split time—0.1 min.), CU (catch-up), or PSM (pass split marker) controls are activated. (The latter two controls are discussed subsequently.)

Timer 21 records the amount of time the runner has maintained a particular pace. For example, assume the runner starts the race running at a particular speed $S_1$. Subsequently, the runner encounters a hill which causes him to activate the change speed CS lever in a negative direction causing his speed to decrease by one-quarter of a mile per hour. The change speed signal CS would operate in regard to the circuitry seen in FIG. 1 in the manner above discussed in order to change the runner's speed and, in addition, would cause gate 24 to read the prior goal speed S into the multiplier 22. The CU signal would also cause timer 21 to read its contents via gate 105 into multiplier 22 and be reset thereafter by the CU signal from gate 106. The multiplier 22 would cause the speed $S_1$ to be multiplied by the elapsed time $T_1$ from timer 21 giving the distance $D_1$ traversed at the first speed, which distance would be entered into adder 25. If, subsequently, the runner should change his speed again, by actuating, for example, the change speed lever or the S-1 control, the prior speed $S_2$ would be read into multiplier 22 with the timer 21 entering the amount of time at which the runner was running at the speed $S_2$. The product $S_2 \times T_2$ would be entered into adder 25 as the value $D_2$ which would be automatically added to the prior distance value $D_1$, giving a distance value $SD_T$ corresponding to the total distance traversed in the split by the runner at both speed 1 and speed 2. Thus, adder 25 will maintain a record of the total distance which the runner has covered in any particular split. A read-out of the total distance traversed since the start of the race, DT as opposed to since the start of the split can be obtained by modifying the circuitry so that the distance $SD_T$ will be automatically added to the split distances $SD_1$, $SD_2$, . . . , corresponding to the splits already run and completed, by adder 25a (FIG. 2) and displayed. One can keep track of the splits completed by recording the number of times the pass split marker control PSM has been activated. The PSM control shall be discussed subsequently.

Actuating the total distance control TD, will read out the distance from adder 25a and send it to a display unit 55 via gate 26.

6. Status Display (STA)—FIG. 2

The next feature to be described is the status control STA whereby actuating the status control switch in one direction will cause the amount of time by which the runner is ahead or behind his preset time for the split to be displayed. Actuating the status switch in the other direction will display the total elapsed time (TET) for the split or since the beginning of the race as will be explained subsequently. The amount of time that the runner is ahead or behind his preset target time can be determined in accordance with the following:

$$\frac{\text{target time}}{\text{split distance}} = \frac{\text{on-schedule time}}{\text{actual distance run}}$$

and $$\text{actual elapsed time} - \text{on-schedule time} = \text{time off-schedule}$$

That is, the target time $TT_i$ set by the runner into the memory for traversing the total split distance $SD_i$ is to the split distance as the on-schedule time for running any portion of the split distance is to this actual distance run. Thus, the on-schedule time for any particular partial distance within a split would be equal to the target time TT multiplied by the actual distance run divided by the total split distance. The total elapsed time minus the on-schedule time will equal the time by which the runner is behind his preset schedule with negative readouts indicating that the runner is ahead of schedule by the negative amount indicated.

Logic for performing this status function on a per split basis and for the whole race is seen in FIG. 2. By activating the status control switch STA, the total distance traversed within the split (or over the race to that point) at the time of activation will be read from the adder 25 (25a) through gate 27 (34a) into multiplier/divider 28 (28a). The preset split distance and target time for the particular split (or total race) being run would be read from split distance register 5 and target time register 4 (FIG. 1). The split distance SD and the target time TT are read via gates 29 and 30 (29a and 30a) into multiplier/divider 28 (28a) which would multiply the target time by the total split distance run $SD_T$(race distance or RD) and divide the product by the split distance giving a readout of the on-schedule time $OST_S$ ($OST_R$) which the runner should have used in traversing the actual total distance $SD_T$ (RD). The total elapsed time since the commencement of the given split would be recorded in timer 31 (the total elapsed time since the commencement of the race being recorded in timer 31*a* which starts time recordal upon actuation of the start control) which would start time recordal at the beginning of any particular split in response to a start signal or a pass split marker signal (to be described). By actuating the status switch, the elapsed time for the split (ET-S) (and for the race—ET-R) would be read via gate 32 (34*a*) into subtracter 33 (33*a*) which subtracts the on-schedule time from the split elapsed time ET-S (and on-schedule time for the race from the total elapsed time ET-R) giving a plus or minus indication of time status with plus indications denoting the time by which the runner is behind his preprogrammed schedule and negative readouts indicating the amount by which the runner is ahead of his preprogrammed schedule. The + or − time status is displayed to the runner by means of display 55.

7. Elapsed Time TET—FIG. 2

Another feature of the invention is the elapsed time TET display according to which the total elapsed time since the start of the race or of a split is displayed. It is contemplated that the switch which controls the aforedescribed status feature will also control the elapsed time display in that actuation of the switch lever in one direction would cause a display of the runner's status and actuation of the switch in the other direction would cause the readout of the total elapsed time ET-R since the beginning of the race. Logic for performing this elapsed time feature is seen in FIG. 2 where gate 34 in response to signal TET will read out from timer 31*a* the total elapsed time ET-R and route this time readout to display 55. The timer 31*a* is started by the start control, which was not shown in FIG. 1, but which would be activated at the beginning of the race. If it is desired to read the elapsed time since the beginning of a particular split, TET, the gate 34 could, of course, be connected to the timer 31, which records split elapsed time.

8. Catch-Up Feature CU—FIG. 3

The next aspect of the invention to be described is the catch-up (CU) control for producing a catch-up striding signal. During the course of his run, the runner may change his speed a number of times because of fatigue or physical obstacles such as hills which cause the runner to fall behind his preprogrammed target time $TT_i$ for a particular split. The runner may subsequently wish to return to his preprogrammed schedule because of, for example, the passage of the fatigue or because the runner has surmounted the physical obstacle which caused him to deviate from his race plan. The catch-up feature will cause a new striding signal sound output to be produced which will be precisely timed so as to allow the runner to catch up to his preprogrammed target time by the end of the split.

Figure 3:
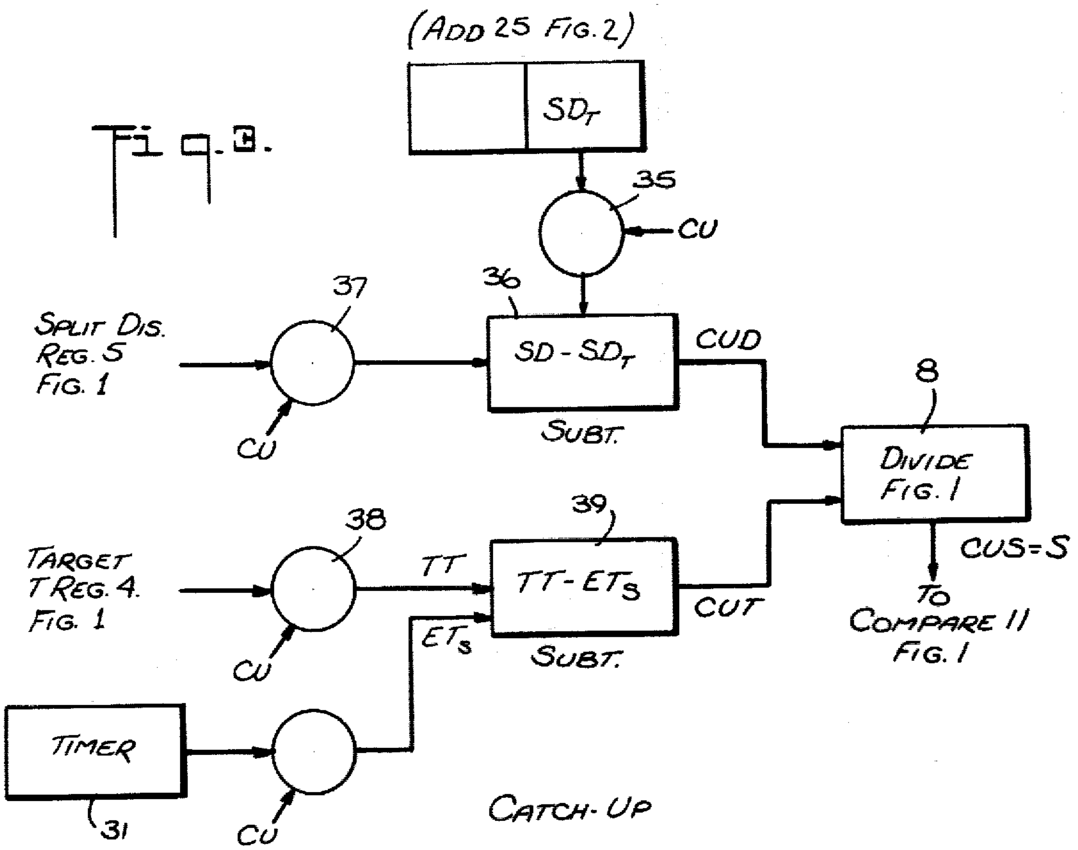
FIG. 3 shows the catch-up (CU) logic arrangement.

FIG. 3 shows logic for carrying out the catch-up function. Adder 25 (which was described in connection with FIG. 2) contains an indication of the total distance $SD_T$ traversed in a split up to any particular readout time. When the catch-up control is activated, the FIG. 2 circuitry, including timer 21 and multiplier 22, will read into adder 25 the distance traversed at the last set speed which will be automatically added to the prior distances and summed in adder 25 thus giving an up-to-the-second reading of the total distance covered in the split, as was described in connection with the total race distance display feature. The catch-up signal CU will open gate 35 (FIG. 3) passing the total distance $SD_T$ so far traversed in the split to subtracter 36. Simultaneously gate 37 will read the split distance SD from split register 5 (FIG. 1) and enter this value into subtracter 36. Subtracter 36 will calculate the difference between the split distance SD and the total distance traversed $SD_T$ at the instant of activation of the catch-up control. The catch-up signal simultaneously opens gate 38 passing the preset target time TT from the target time register 4 (FIG. 1) into subtracter 39 which received as its outer input a reading of the elapsed time (TET) from the timer 31 (FIG. 2). The target time minus the elapsed time gives a new catch-up time CUT which corresponds to the amount of time the runner has left to complete the split in accordance with his preset target time goal TT. Similarly the split distance SD minus the distance DT actually traversed up to the time of activation of the catch-up signal gives a reading of the catch-up distance CUD which is the total distance remaining in the split. The new catch-up distance CUD and catch-up time CUT are then fed to divider 8 which was described in connection with FIG. 1 and which will calculate a catch-up speed CUS which will be processed in accordance with the procedures set forth above in connection with FIG. 1. The new goal speed, catch-up speed CUS, will be the speed at which the runner must traverse the remaining distance of the split in order to complete the split as the preset target time TT.

Figure 4:
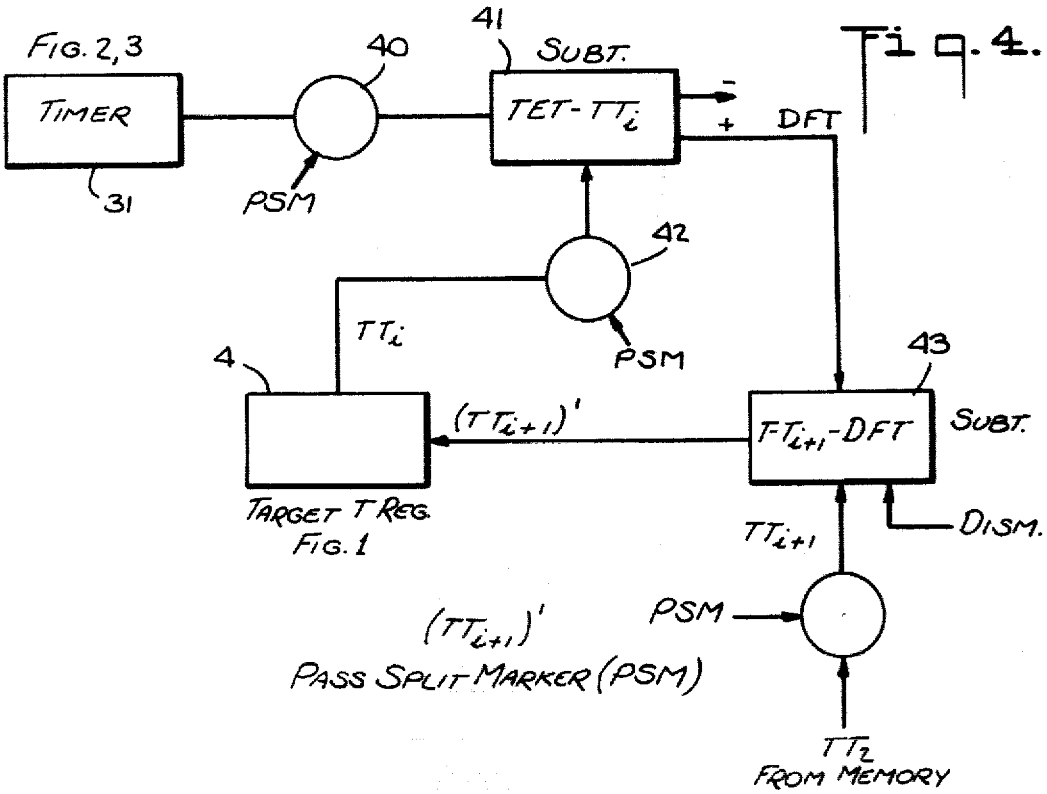
FIG. 4 shows the pass split marker (PSM) logic arrangement.

9. Pass Split Marker (PSM)—FIG. 4

The next feature to be described will be the pass split marker operation whereby the runner will be able to make up for any time deficit in any particular split in the next succeeding split. When the runner passes a split marker he actuates the pass split marker control causing signal PSM to open gate 40 reading the elapsed time TET from timer 31 (which timer was also discussed in connection with FIGS. 2 and 3). The total elapsed time read from timer 31 is entered as one input to subtracter 41. The other input to subtracter 41 will be the preprogrammed target time $TT_i$ for the split just traversed which will be read from total time register 4 (FIG. 1) through gate 42 into the subtracter 41. The subtracter 41 will subtract the preprogrammed target time $TT_i$ from the actual elapsed time TET which will give the total deficit time DFT. A positive value for deficit time DFT indicates that the runner did not meet his target time goal $TT_i$ for the split just traversed and that the runner is behind schedule by a time corresponding to DFT. The pass split marker signal PSM also causes the next target time, e.g., $TT_{i+1}$, stored in memory 1 to be read via gate 43 into subtracter 43. Subtracter 43 will subtract the deficit time DFT from the preprogrammed target $TT_{i+1}$ for the next split to give an adjusted target time value ($TT_{i+1}$), which corresponds to the preprogrammed target time goal for the second split diminished by the amount of time by which the runner was in deficit for the first split. Thus, the striding signal produced by the logic of FIG. 1 will correspond, not to the preprogrammed target time $TT_{i+1}$ which the runner had entered into memory 1, but that value diminished by any deficit time which the runner had in the preceding split. The tone actually produced will, therefore, be such as to bring the runner back on schedule by the end of the second split. If the runner had completed the preceding split $TT_i$ on time or had completed the split faster than his preprogrammed target time goal $TT_i$, the elapsed time for the split read from timer 31 will be smaller than the preprogrammed target time $TT_i$ causing the output of the subtracter 41 to be a negative number. The subtracter 41 output circuitry is such so that only positive values of deficit times DFT are passed to subtracter 43. Thus, if the runner is on schedule or ahead of schedule, the output of subtracter 41 will be negative and will be processed no further causing the next split target time $TT_{i+1}$ to remain in target time register 4 unaltered.

There can be provided an optional disable DISA control (not depicted) for the subtracter 43 if the runner feels that he is not capable of making up lost time in the next split so that the new target times will not be reduced by deficit times. Since deficits for successive splits are cumulative, such a control could be of use where a plurality of splits are involved and the runner is consistently behind his target times.

10. External Memory—FIG. 5

Another aspect of the invention is the external memory function whereby the runner can maintain a record of his pace during any particular race or training session for use in duplicating this effort subsequently. For example, in preparing for a particular race, the runner may train by running the course a number of times in advance to determine the most effective combination of running rates suited to the terrain and his own strengths or weaknesses. The runner can adjust the digital pacing timer during his practice runs to sound tone signals corresponding to the runner's desired pace at a particular stage of the run and maintain a record of these various paces which will be stored in the pacing timer's internal memory unit 1 and be read out onto an appropriate recording medium, such as a magnetic strip for future use.

The logic for performing the memory function is illustrated in FIG. 5. As discussed above, in connection with FIGS. 1 through 4, the pacing timer according to this invention will accommodate changes in the runner's speed in a number of different instances. The runner's speed can be changed if the S-1 (split—0.1 min.), the CS (change speed), the CU (catch-up), or the PSM (pass split marker) controls are activated. As discussed above, each time one of these controls is activated, there will be a recalculation of the runner's speed which will be communicated to the runner by means of the audible striding signal. If the runner wishes to duplicate a prior effort, at some subsequent occasion, record must be kept of each change in speed and amount of time during which the runner was proceeding at each particular speed.

As discussed in connection with FIG. 2, timer 21 is used in connection with multiplier 22 and adder 25 to keep track of the total distance which the runner has traversed in any particular split. As is seen in FIG. 2, timer 21 will pass its output to multiplier 22 when the CS, S-1, PSM, CU, TD (total distance) or STA (status) control is operated. In addition, the timer 21 will be reset each time the CS, S-1, PSM or CU control is actuated since these are the controls which are associated with a change in the runner's speed while TD and STA do not contemplate any speed change. The activating of one of the controls (start control, CS, S-1, PSM or CU) causes the status of timer 21 to be passed through gate 44 into memory 1 via buffer 3. The activation of any of these controls will also open gate 45 causing the particular speed at which the runner is proceeding to be read from speed register 10 (also seen in FIG. 1) to memory 1. Thus, the memory 1 will contain a listing of times $T_1$, $T_2$, $T_3$ and corresponding speeds $S_1$, $S_2$, $S_3$, which information will constitute a recond of a runner's performance over the course of a race or training session. This listing of times and speeds can subsequently be read from memory 1 via conventional read-write circuitry 46 onto some suitable recording medium such as a magnetic strip 47. The runner can in this fashion compile a collection of record strips 47 corresponding to different race routes which he has run in the past.

If the runner wishes to duplicate his effort at some future date, he would select the proper strip 47, enter it into read-write device 46 and cause the listing of times $T_1$, $T_2$, $T_3$, and corresponding speeds $S_1$, $S_2$, $S_3$ to be read into memory 1. After the time/speed information has been entered into memory 1 via read-write device 46, this information can be read out of the memory to control the striding signal. In using this mode of operation, no split distances are involved and the speeds $S_1$, $S_2$ . . . can be sent directly to speed register 10. The time listings $T_1$, $T_2$, $T_3$ are directed to a comparing circuit 50 which will compare each time with the output of timer 49. When the output of timer 49 corresponds to the particular time $T_1$, $T_2$ fed to comparator 50, an output signal from the comparator resets timer 49 and causes buffer 3 to read out the next time and speed ($T_2$, $S_2$). In this way the appropriate speeds $S_1$, $S_2$, $S_3$ are fed directly to speed register 10 and remain therein for an amount of time $T_1$, $T_2$, $T_3$ which corresponds to the runner's previous performance. The speed register will continue to function as discussed in connection with FIG. 1 to produce output tones indicating to the runner that speed at which he is to run if he is to match his previous performance.

11. Pulse Rate Monitor PR—FIG. 6

The pacing timer constructed in accordance with the teachings of this invention is particularly suited to use in combination with external pulse rate monitors. FIG. 6 depicts a conventional pulse rate monitor 51 which has its output connected to a comparator 53 which would be located within the pacing timer. The pulse rate monitor output could be in a binary format compatible with the digital pacing timer format or appropriate conversion circuitry 53' could be provided so as to convert the output of the monitor to an appropriate format. It is contemplated that the runner would enter his maximum pulse rate into pulse rate register 52 by means of a keyboard. The maximum pulse rate can be stored in a register distinct from memory 1 (FIG. 1) or can be stored in a register of memory 1. The maximum pulse rate storage location 52 is connected to the comparator circuitry 53 which also received the runner's actual pulse rate from the pulse rate monitor 51. Should the runner's pulse rate exceed the maximum preset rate, comparator circuitry 53 activates sounding circuitry 101 which will warn the runner to decrease his rate of running so as to bring his pulse rate down to an acceptable value. It is also contemplated that the pacing device include a pulse rate display control PR which, when activated, will cause the pulse rate which is being monitored by circuitry 51 to be displayed on the pacing timer's display 55.

12. End of Split Warning—FIG. 7

FIG. 7 depicts circuitry for causing the pacing timer to emit a different tone 15 seconds before the end of each split and at the end of each split so that the runner can compare his actual physical location with time signals which will have a correspondence to the location of the end of any particular split. The target time register 4 described in connection with FIG. 1 has therein the preprogrammed target time goal which the runner has set for himself for a particular split. At the beginning of the race and each successive split, timer 31 will be reset and activated to provide an indication of elapsed time to augmentor 62 which functions to add 15 seconds to the elapsed time value. The T+15 signal from augmentor 62 will be fed to comparator 63. When the amount of elapsed time since the start of the split is equal to the target time TT minus 15 seconds, there will be coincidence between the output of augmentor 62 and target time register 4 which will cause comparator 63 to activate a different tone signal which will indicate that the runner has 15 seconds to reach the split marker. When the total elapsed time from timer 31 is exactly equal to the preprogrammed target time entered in register 4 there will be a coincidence at comparator 63 and a tone will be sounded which will indicate to the runner that at this particular time he should be passing the split marker. These two tones give the runner an indication as to how far behind schedule he is in terms of physical distances which the runner will be able to judge visually. When a runner passes a split marker he will actuate the pass split marker control to cause the signal PSM to be communicated to timer 31 thereby resetting the timer for the start of the next split.

13. Race time minus 6 (R−6) Function

FIG. 8 shows circuitry which is used for effecting an additional function called race time minus 6 (R−6). The R−6 function is used when the runner wishes to reestablish his total race time goal by diminishing this goal by 6 seconds. As mentioned in connection with FIG. 1, the R−6 function would be used normally as an alternative to the S−1 function which latter operates in readjusting any particular split time. The runner in establishing his split time goals at the beginning of the race, may have underestimated his capacity on the particular day of the race and sometime during the course of the race the runner may wish to set a new overall time goal for finishing the race. The race time minus 6 function will cause the split times for all of the splits which remain to be run plus the time remaining in the split currently being run to be diminished so that the runner will finish the race six seconds earlier than his pre-established total race time goal. The R−6 logic shown in FIG. 8 will provide the proportionate reduction in remaining split times so as to achieve the overall six second reduction of the race total time goal.

The operation of the logic of FIG. 8 is as follows. The race total time goal (RTT) is entered into register 801. The overall time goal for the race can be entered into register 801 at the beginning of the race by the runner or can be automatically calculated by appropriate logic, which, in response to the R−6 signal, would simply add all of the split times contained in the memory and place the sum of these split times into the RTT register 801. The total elapsed time since the beginning of the race is fed from ET-R timer 31*a* (FIG. 2) to subtracter 802 along with the race total time RTT. The difference between the race total time and the total elapsed time since the beginning of the race will give the total time remaining in the race (TTR). The total time remaining, TTR, along with the value corresponding to the total time remaining minus 6 seconds calculated by subtracter 803, is fed to multiply-divide circuit 804. The calculations performed by the multiply-divide 804 are based on a simple proportion whereby the total time remaining minus 6 seconds is to the actual total time remaining (TTR) as a new split target time (NTT) is to a pre-established split target time (TT).

$$\frac{TTR - 6}{TTR} = \frac{NTT}{TT}$$

$$\frac{TT \times (TTR - 6)}{TTR} = NTT$$

Thus, a new split target time NTT will be calculated on the basis of the above equation by circuit 804 and with these pre-established split times being successively replaced by the newly calculated split target times, NTT, corresponding to the new total time goal for the entire race. The split times are fed to circuit 804 in the following manner. The operation of the R−6 control causes a simple timer 805 to produce sequentially timing pulses T1 through T5. The first timing pulse T1 will operate in regard to the particular split which the runner is in the process of running when the R−6 control is operated. The particular speed at which the runner is running the current split is altered by a factor which will cause the runner to increase his speed for the remaining portion of the split being run so that the runner will complete this current split at a time which is consistent with the overall goal of completing the race six seconds ahead of the pre-established total race goal. Since speed is inversely proportional to time, the new speed can be calculated on the basis of the simple proportion: preset speed (S) is to new speed (NS), as the new time remaining (TTR−6) is to the prior established total time remaining (TTR).

$$\frac{S}{NS} = \frac{TTR - 6}{TTR}$$

$$\frac{S \times TTR}{TTR - 6} = NS$$

The multiply-divide circuit 806 establishes the new speed in accordance with the above formula. The prior established speed, calculated by the circuitry of FIG. 1, had been placed in speed register 10 and is read from the speed register into the multiply-divide circuit 806 by the T1 timing pulse, the new speed is calculated, and automatically placed into memory 1 and into speed register 10. For the remainder of the split currently being run, this new speed NS will pace the runner and will cause the runner to speed up so that the split will be finished in a somewhat shorter time which will be consistent with the overall desired goal of reducing the pre-established total race time goal by six seconds.

The remaining timing pulses T2 to T5 (of course, there can be more or fewer timing pulses depending upon how many splits are stored in the memory) will function to time the recalculation of the split time in regard to those splits which have yet to be run. The recalculation is effected with the aid of split counter 807 which effectively keeps track of the number of splits which have been run. Split counter 807, which can have any number of stages of which five are illustrated in FIG. 8, is responsive to the start control STR and the past split marker control PSM. The outputs of the counter 807 which are connected to gates 808 are enabling outputs until the particular split indicated by the numbers in counter 807 has commenced. For example, assume that the runner is in the process of running the fourth split. At the beginning of the race the start control STR was activated which disabled counter stage 1. When the runner passed the first split marker, the pass split marker control PSM was activated causing the disabling of stage 2, and similarly when the third and fourth splits were started, the PSM control was activated which disabled the outputs from stages 3 and 4 of the counter 807. When the R−6 control is activated, the T1 timing pulse will read out the speed from speed register 10 and a new speed for the fourth split will be recalculated as explained above. At timing pulse T2 the split 2 gate connected to stage 2 of split counter 807 will not be enabled since, as mentioned, stage 2 will be presenting a disabling output. Similarly, at times T3 and T4 the gates connected to stages 3 and 4 of the split counter 807 will similarly be disabled because of the disabling signals from the third and fourth stages of split counter 807. At time T5, however, there will be enabling signals from both the fifth stage of split counter 807 and from the T5 timing pulse. This will cause the split target time TT-7 from memory 809 to be read from the memory and passed to multiply-divide circuit 804. The newly calculated split target time goal NTT is then fed back to the memory 809 and entered into the appropriate memory register by virtue of the T5 timing pulse operating in regard to gate 810.

14. Microprocessor Embodiment

As mentioned at the outset, it is contemplated that the above-described functions could be performed with the aid of a commercially available microprocessor unit having a central arithmetic and logic unit constructed in accordance with large scale integration techniques that reflect the present state of evolution in computer miniaturization. It is believed that it is economically feasible to use a properly programmed microprocessor to carry out the specific teachings of this invention since microprocessors are now so inexpensive that it is usually cheaper to exploit as little as 10% or even 5% of the computing power of an existing microprocessor chip than it would be to invest in the design of a special unit which would accomplish a task with the minimum number of electronic components. Utilizing a microprocessor to carry out the teachings of the invention entails a properly programmed read-only memory which would contain the control program for the unit as well as read-write random access memory chips for storing information which is not fixed such as target times and split distances. An instruction set for carrying out the teachings of this invention would be held in a read-only memory or in a random access memory chip. Of course, instead of using standard microprocessor chips one could design a special unit for carrying out the teachings of this invention.

The programming steps for carrying out the functions previously described in connection with FIGS. 1–8 will be evident to one skilled in the programming arts who has considered the operations described in connection with FIGS. 1–8. For example, determining the time per stride with a microprocessing system would include the steps of reading the target time and split distances from memory, dividing split distance by target time to obtain speed, testing the CS control to determine whether the runner wishes to change speed, if yes, adding or subtracting a fixed increment to the determined speed in accordance with the activated CS control, comparing the resultant speed with the list of speeds $S_1$, $S_2$, from memory, upon finding correspondence between the speed and the stored or extrapolated speeds $S_1$, $S_2$, reading the stride length corresponding to the identified speed $S_1$, $S_2$, from memory, and dividing the stride length by the speed to obtain time per stride. In addition, one would test the SPD control, and, if activated, display the calculated speed value. One would test the R-15 control, and if activated, modify the target time by a fixed amount as discussed in accordance with FIG. 1.

A record of the total distance traversed, as per FIG. 2, would be kept in accordance with a sub-program which would test the TD, STA, CU, PSM, S-1 and CS controls. If any of these controls were activated, elapsed time would be multiplied by the determined speed to give a distance value which would be added with any prior determined distance values to give a total distance TD. The TD sub-routine would also consist of testing the TD control, and if activated, reading out this TD value.

The STA sub-routine would include the steps of multiplying target time TT by the total split distance $SD_T$ and dividing the product by the split distance to obtain the on-schedule time. The elapsed time minus this on-schedule time would give the time status. Stated another way the STA sub-routine would include the steps: (1) calculate DT (as in previous paragraph, (2) multiply target time times DT, (3) divide product by split distance to get on-schedule time, (4) read elapsed time from timer, (5) subtract on-schedule time from elapsed time to get time status, (6) display time status.

In a similar fashion the other program steps necessary to carry out the functions taught by this invention could be easily derived by simply inspection of the FIGS. 1–8 logic with programming steps being based on the desired functions carried out by FIGS. 1–8 logic.

15. Packaging, Units, Limits on Display/Tones, Modifications

A device constructed in accordance with the teachings of this invention would be preferably packaged into as small a space as feasible, preferably into a unit which could be carried on the runner's hand as is described in applicant's copending application Ser. No. 51,135, filed on June 22, 1979 and titled "Pacing Timer Mounting Arrangement". Of course, size and cost considerations could dictate that portions of the circuitry could be located in a separate unit carried, for example, at the runner's waist with wire communications between the hand unit and the waist unit. It is also possible the portions of the unit, such as the keyboard and magnetic strip, be contained in a detachable unit which the runner would not carry during running.

It is also contemplated that there be provided a kilometer/mile conversion unit located in the input/output circuitry of the pacing device according to this invention so that the runner can utilize the units most convenient or familiar to him. If a microprocessor is used to carry out the teachings of this invention, this conversion could, of course, be effected by a special program in the read-only memory.

The striding tone signals can be emitted from a speaker located at the digital pacing timer unit or could be communicated to the runner via an appropriate earphone attachment. The striding signal tone can sound continuously or, preferably, would sound for only approximately one minute after the start of any particular split and would also sound for approximately 15 seconds every time a button showing current running rate is depressed and also every time one of the other controls is activated which change the rate of running. A sounding of the striding signal for such periods will be adequate to allow the runner to reach a constant stride which he will maintain without the further aid of the striding signal. Similar timing limits can be included in the display unit so that any particular information which is displayed can be automatically terminated after an appropriate period, for example 15 seconds, or until another control is activated calling for a different display.

It is contemplated to provide that if the speed display control, SPD, were held down for 2 seconds, the tone would continue to sound until this or another control was activated. As mentioned, it is contemplated to provide a single control lever for specified dual functions. For example, a change speed control lever CS could be activated in one direction for an acceleration in speed and in the opposite direction for deceleration. Similarly the elapsed time control ET and the status control STA could share a single lever. When using the pass split marker control, it is contemplated that the amount of time ahead or behind schedule be shown on the display and also that the signal tone sound for 15 seconds. Various other modifications could be made and it is possible to exclude various functions in order to simplify the circuitry and effect cost economies as the functions are not mutually dependent. As mentioned at the outset, the speed-stride length table can be a permanent part of the device's memory with average values being used.

Since certain changes may be made in the above-described pacing timer, without departing from the scope of the invention involved herein, it is intended that all matter contained in the above description or shown in the accompanying drawings shall be interpreted as illustrative and not in a limiting sense.

What is claimed is:

1. A pacing timer for runners including:
(a) a memory including means for storing information corresponding to
  (i) a plurality of stride lengths with the stride lengths corresponding to various speeds of running,
  (ii) at least one split distance to be run, and
  (iii) at least one target time in which the runner is to complete said split distance;
(b) means for determining the speed at which said split distance is to be run from said split distance and target time information stored in said memory;
(c) means for identifying from said plurality of stride lengths stored in said memory the stride length corresponding to the speed determined by said determining means;
(d) means for defining a period of time corresponding to the runner's stride time, said defining means being operatively responsive to said determining means and said identifying means with said stride time being dependent upon said split distance, said target time, and the stride length identified by said identifying means; and
(e) means, operatively responsive to said defining means, for providing a signal to the runner corresponding to said stride time.

2. A pacing timer in accordance with claim 1 in which said memory includes means for storing a plurality of split distances, the sum of which corresponds to the total distance to be run, and means for storing a plurality of target times, the sum of which corresponds to the total goal time in which the total distance is to be run.

3. A pacing timer in accordance with claim 2 including pass split marker control means for altering a subsequent target time corresponding to a subsequent split distance to be run by an amount corresponding to the amount of time by which the runner failed to achieve a target time corresponding to at least one split which the runner has completed.

4. A pacing timer in accordance with claim 2 including means for entering into said memory performance information corresponding to a runner's actual performance during the course of running and including output means for reading said performance information from said memory onto a record member and including means for subsequently reading said record member and reentering the performance information stored thereon into said memory and further including means responsive to said reentered performance information for controlling said defining means.

5. A pacing timer in accordance with claim 2 including means for storing information corresponding to the maximum pulse rate of the runner, means for inputting the actual pulse rate of the runner, and means for comparing said maximum pulse rate with said inputted actual pulse rate.

6. A pacing timer in accordance with claim 1, 2, 3, 4 or 5 including an optical display means for visually communicating information to the runner.

7. A pacing timer in accordance with claim 6 including a status control means including means for determining the on-schedule time and means for displaying on the display means the amount of time the runner is ahead or behind the on-schedule time.

8. A pacing timer in accordance with claim 7 wherein there is included a total distance control means for displaying on the optical display the total distance traversed by the runner said total distance means being connected to said optical display.

9. A pacing timer according to claim 1 or 2 including a means for altering the period of time corresponding to said runner's stride time, said altering means being operatively responsive to a control activated by the runner during the course of running said split distance.

10. A pacing timer according to claim 9 wherein the altering means includes means for changing the speed at which the split distance is to be run by a fixed increment in the positive and negative directions.

11. A pacing timer in accordance with claim 9 wherein the altering means includes means for reducing the target times by a fixed increment of time each time said altering means is activated.

12. A pacing timer in accordance with claim 9 including a catch-up means for redefining the period of time corresponding to the stride time in accordance with
  (i) the target times, and
  (ii) the distance traversed by the runner up to the time of activation of the catch-up means.

13. A method for pacing a runner by means of an electronically produced striding signal including
(a) storing in a memory data corresponding to
  (i) a plurality of stride lengths with the stride lengths corresponding to various speeds of running,
  (ii) at least one split distance to be run,
  (iii) at least one target time in which the runner is to complete the split distance;
(b) defining a period of time corresponding to the runner's stride time, said defining being dependent upon the stored split distance, target time and at least one stride length; and
(c) providing a signal to the runner corresponding to said stride time.

14. A method for pacing a runner by means of an electronically produced striding signal including
(a) storing in a memory data corresponding to
(i) a plurality of stride lengths with the stride lengths corresponding to various speeds of running,
(ii) a plurality of split distances to be run,
(iii) a plurality of target times in which the runner is to complete the split distances;
(b) determining the speed at which split distances are to be run from the split distance and target time information stored in said memory;
(c) identifying from the plurality of stride lengths stored in the memory the stride length corresponding to the determined speed;
(d) defining a period of time corresponding to the runner's stride time, the defining being dependent upon said split distance, said target time and the identified stride length; and
(e) providing an audible signal to the runner corresponding to the stride time.

15. A method according to claim 14 including altering the period of time corresponding to the runner's stride time in response to a control activated by the runner during the course of running the split distance.

16. A method according to claim 15 including changing the speed at which the split distances are to be run by a fixed increment in the positive and negative directions in response to controls activated by the runner during the course of running said split distance.

17. A method according to claim 15 including reducing the target times by fixed increments of time in response to a control activated by the runner during the course of running said split distance.

18. A method in accordance with claim 14 including redefining the period of time corresponding to said stride time in accordance with
(i) the target time,
(ii) the elapsed time up until the time when the redefining is effected, and
(iii) the distance traversed by the runner up until the time when said redefining is effected.

19. The method according to claim 14 including altering a subsequent target time corresponding to a split distance to be run by an amount corresponding to the amount of time by which the runner failed to achieve a target time corresponding to a split distance completed by the runner in response to a control activated by the runner when the runner terminates the completed split distance.

20. The method according to claim 14 including entering into the memory performance information corresponding to a runner's performance during the course of running and reading out of said memory said performance information onto a record member and including subsequently reading the record member and reentering the performance information stored thereon into the memory.

21. The method according to claim 14 including storing information corresponding to the maximum pulse rate of the runner and comparing said maximum pulse rate with the runner's actual pulse rate.

22. The process according to claims 13, 14, 15, 16, 17, 18, 19, 20 or 21, including visually communicating information to the runner by means of an optical display.

23. A method according to claim 22 including determining the on-schedule time and displaying the amount of time the runner is distant from the on-schedule time in response to a control activated by the runner during the course of running the split distances.

24. The method according to claim 22 including displaying the distance traversed by the runner on said optical display in response to a control activated by the runner during the course of running.

25. A pacing timer for indicating a repetitive striding signal, the pacing timer being characterized in that there are provided:
first storage means for storing data corresponding to a plurality of predetermined runner speeds and respectively associated predetermined stride lengths;
second storage means for storing data corresponding to a selectable runner speed at which a runner desired to run;
first arithmetic means for comparing said selectable runner speed to said predetermined runner speeds to select a particular corresponding one of said respectively associated predetermined stride lengths; and
second arithmetic means for determining a repetition rate for the repetitive striding signal in response to said selectable runner speed, and said particular corresponding one of said respectively associated predetermined stride lengths.

26. The pacing timer of claim 25 wherein there are further provided:
third storage means for storing data corresponding to at least one split distance which the runner desires to run and a corresponding target time during which the runner desires to traverse said split distance; and
third arithmetic means for calculating said selectable runner speed in response to said split distance and said corresponding target time.

27. The pacing timer of claim 26 wherein there is further provided speed alteration means for altering said repetition rate for the repetitive striding signal in response to a runner-operable control.

28. The pacing timer of claim 27 wherein said speed alteration means further comprises means for varying said data corresponding to said split distance.

29. The pacing timer of claim 27 wherein said speed alteration means further comprises means for varying said data corresponding to said target time.

30. The pacing timer of claim 26 wherein there is further provided fourth storage means for cumulatively storing data corresponding to a distance traversed by the runner.

31. The pacing timer of claim 30 wherein there is further provided catch-up means for altering said repetition rate for the repetitive striding signal in response to said target time and the value of said cumulatively stored distance data in said fourth storage means at the moment that said catch-up means is operated.

32. The pacing timer of claim 26 wherein there is further provided audible tone means for producing an audible tone indication, said audible tone indication being in the form of tone bursts at said repetition rate for said repetitive striding signal.

* * * * *